Patented Sept. 23, 1941

2,256,886

UNITED STATES PATENT OFFICE 2,256,886

EMULSION AND METHOD OF PREPARING THE SAME

Walter D. Buckley, Berkeley, Calif., assignor to American Bitumuls Company, San Francisco, Calif., a corporation of Delaware No Drawing. Application May 20, 1938, Serial No. 209,065

9 Claims. (Cl. 252—312)

This invention relates to stabilized bituminous emulsions and methods of preparing the same. The invention contemplates the use of certain stabilizers which, by reason of special properties they possess, impart new, unpredictable and useful characteristics to the emulsion. Likewise, the invention involves a method of stabilizing bituminous emulsions to yield a product having improved properties.

Quick-setting bituminous emulsions having an aqueous alkaline phase are well known in the emulsion art and have received wide commercial application. Such emulsions are termed "quick-setting" because they tend to quickly break down or separate and coalesce when diluted with water, contaminated with electrolytes or foreign matter, combined with aggregates or fibrous material or applied to surfaces in the customary methods of handling. For certain uses, however, it is desirable or even absolutely necessary that bituminous emulsions be sufficiently stable to mix with electrolytes, fibrous materials, cement and the like without coalescence or premature breakdown. Such an emulsion is said to be a slow-setting or mixing type emulsion.

Stability against coalescence and undue settlement in storage are essential requirements for all bituminous emulsions whether they be of the quick-setting or slow-setting type. This invention provides an emulsion which meets these requirements of stability in storage. Stability against break-down by reason of contact with stone or electrolytes or in mixing is a prerequisite for satisfactory emulsions of the slow-setting or mixing type which also must be stable in storage, as above noted. One test for stability against break-down by electrolytes, etc. comprises the cement mixing test. The cement mixing test utilized for obtaining the data given in the present specification involves the following procedure: 50 grams of Portland cement previously sieved through a No. 80 sieve is placed in a container having a capacity of approximately 500 cc. 100 cc. of the emulsion to be tested is poured on the cement and stirred with a ½ inch steel rod sixty times during one minute. 150 cc. of distilled water is then added and stirring continued for three minutes. Ingredients and apparatus are maintained at a temperature of approximately 77° F. during mixture. The mixture is then poured through a tared 14-mesh iron wire sieve and rinsed until the wash water is clear. The screen is then placed in a shallow pan, heated until dry and weighed. The weight in grams of the material retained on the screen and in the pan is the percentage broken. To pass the mixing test, not more than 5% should be broken.

The present invention involves the discovery that a quick-setting bituminous emulsion having an alkaline aqueous phase may be stabilized to pass the above cement mixing test by addition of "Vinsol" resin thereto. The "Vinsol" resin referred to herein is a product of the Hercules Powder Company, sold under the trade-name "Vinsol Resin." This resin is a new product obtained by improved methods from the wood of Southern long-leaf pine. As used herein, the term "Vinsol Resin" refers to this new product which is a hard high-melting, dark-colored resinous material, black in color when viewed by reflected light but dark red when viewed by light transmitted through a film of the resin.

Accordingly, an object of the present invention is to provide a slow-setting or mixing type emulsion by stabilizing the emulsion against breakdown when mixed with cement or other foreign materials.

Stabilized slow-setting bituminous emulsions are often entirely satisfactory from the standpoint of stability against break-down, as determined by standard cement mixing tests, but are unsatisfactory for certain uses because of objectionable drying rates. Such emulsions are characterized by a very slow dehydration rate, and when applied as a coating or the like form a film or skin on the surface in a manner such that proper drying of the underlying emulsion is inhibited or prevented. Although emulsions having this inferior drying property are useful, it is highly advantageous, and in some instances essential, that a bituminous emulsion be characterized not only by stability against break-down but by an ability to give up a major portion of its contained water in a reasonably short time. A convenient dehydration test, and the one utilized for obtaining the data given in the present specification on drying rates, is as follows:

100 grams of the emulsion to be tested is placed in a tared pyrex dish, 77 mm. in inside diameter by 40 mm. in height, having a flat bottom and straight sides. The dish is placed in the center of a shallow pan about 5 inches in diameter, and 50 grams of granular anhydrous calcium chloride is spread in the pan so that it surrounds the dish containing the emulsion. The entire unit is then placed in a constant temperature oven set at 100° F. At the end of exactly 96 hours, during which time the sample is not disturbed by stirring or excess movement, the loss of weight of the emulsion is determined. The dehydration loss is expressed as the per cent of the loss in this test in 96 hours based on the loss in a test for residue at 163° C. as described paragraph 15 of Tentative Methods, A. S. T. M. Designation D244–36T. A satisfactory quick-drying mixing emulsion will show a dehydration loss of 60% or more by this test.

A feature of the invention comprises the discovery that, by utilizing a particular mode of operation or order of process steps in stabilizing alkaline bituminous emulsions with "Vinsol" resin, a product characterized by both stability against break-down and superior quick-drying properties may be obtained.

Further objects and advantages of the invention comprise the production of stabilized bituminous emulsions which remain stable even though stored at relatively high temperatures, such as 100° F. or over, encountered in summer heat and which are also capable of retaining stability during repeated cycles of freezing and thawing. Such an emulsion can be satisfactorily stored without protection from freezing during winter or from heat during summer.

It is known that bituminous materials, particularly certain petroleum asphalts such as Mexican and California asphalts, contain ingredients which react with water-soluble alkaline materials, such as caustic soda, caustic potash, soda ash, potassium carbonate, sodium metasilicate and trisodium phosphate, to form emulsifying agents. The exact chemical constitution of these ingredients is not known, but they are commonly designated by the generic name "asphaltogenic acids." The reaction product of the asphaltogenic acids with water-soluble alkali may be utilized either alone or in combination with other primary emulsifying agents to produce preformed alkaline emulsions suitable for stabilization according to the present invention.

In the preferred embodiment of the invention a bituminous emulsion is utilized in which the reaction products of alkaline materials with the naturally-occurring constituents of the bitumen are the sole primary emulsifying agents. However, as above noted, the use of suitable auxiliary primary emulsifying agents is within the scope of the invention in its broader aspect. For instance, high molecular weight naphthenic acids may be employed for emulsification in the same manner as the previously mentioned asphaltogenic acids. The alkali salts of such naphthenic acids, either formed in situ during emulsification from added naphthenic acids, or added separately, are embraced by the invention. Likewise, high molecular weight acids formed by partial oxidation of petroleum hydrocarbons by methods known in the art, or acids such as those contained in montan wax, when used as auxiliary primary emulsifiers are to be regarded as within the broader scope of the invention. The alkali salts of these acids may be formed either separately or in situ during emulsification of the bitumen. Similarly, a salt of "Vinsol" resin, either preformed by reaction of "Vinsol" resin with caustic alkali or formed in situ by reaction of "Vinsol" resin with the alkali of the aqueous dispersing medium, may be utilized as an auxiliary primary emulsifier for the production of preformed emulsions to be treated according to the present invention. The salt of "Vinsol" resin may be formed in situ, for example by fluxing the "Vinsol" resin with the asphalt, and then dispersing the mixture in alkaline water whereby the alkali in the water reacts with the "Vinsol" resin in the asphalt. On the other hand, it has been found that the presence of ordinary fatty acid soaps in the emulsion has an undesirable and deleterious effect on the action of "Vinsol" resin stabilizing agents. Preformed emulsions containing fatty acid soaps in small quantities can sometimes be stabilized by the method herein disclosed, but the stabilized emulsion usually has less desirable qualities.

Illustrative methods of preparing quick-setting bituminous emulsions suitable for stabilization according to this invention are disclosed in the patent to Montgomerie No. 1,643,675, granted September 27, 1927, and in the patent to Braun No. 1,737,491, granted November 26, 1929. The aqueous phase of such preformed emulsions usually has an alkalinity above pH 11.5 and generally in the order of 12 to 13. It is to be noted that the upper limit of pH is not critical within the range wherein the preformed emulsion is itself satisfactory, that is, stable against coalescence of the dispersed phase under storage conditions at atmospheric temperatures above 32° F. Such an alkalinity may be obtained not only by the preferred use of from approximately 0.10 to 0.20% by weight of caustic soda based on the completed emulsion but by the use of other water-soluble alkali in the aqueous phase, as herein previously pointed out.

Although the above type emulsions are utilized in the preferred embodiment of the invention, the stabilizer and process herein disclosed are applicable to bituminous emulsions having an alkaline aqueous phase even though such emulsions are not strictly quick-setting but have a stability against break-down by electrolytes, etc. between that of a strictly quick-setting and slow-setting emulsion. Examples of emulsions having such intermediate stability are those utilizing auxiliary primary emulsifying agents, such as previously mentioned herein, in quantities sufficient to give a stability against breaking greater than that which characterizes quick-setting emulsions but insufficient to pass the cement test required for slow-setting or mixing emulsions.

As has been previously indicated, this invention involves stabilization of a bituminous emulsion heaving an alkaline aqueous phase by addition of "Vinsol" resin thereto. The resin is preferably added in powdered or granulated form by first forming an aqueous slurry of the powder and then adding the slurry to the preformed emulsion. Also, the powdered or granulated "Vinsol" resin may be added directly to the emulsion to effect stabilization. Although "Vinsol" resin is water-insoluble, it reacts with the alkali in the aqueous phase of the emulsion and reduces the pH of the emulsion. The reaction renders the resin dispersible though possibly not strictly soluble in the water phase of the emulsion. The emulsion produced by stabilization with "Vinsol" resin has excellent stability against break-down by electrolytes and retains this stability in storage at either high or low temperatures. This procedure and order of steps also yield a product which is characterized by superior drying properties, as will be discussed in more detail in subsequent portions of this specification.

Insofar as the production of an emulsion having superior drying properties is concerned, it is essential that "Vinsol" resin be added to the emulsion in a quantity sufficient to partially neutralize the alkali in the aqueous phase. This superiority in drying rate is not obtained if "Vinsol" resin is first reacted with stoichiometrical proportions of caustic alkali and the reaction product added to the preformed alkaline emulsion.

In the preferred embodiment of the invention, that is stabilization of a preformed emulsion in which the emulsifying agent consists of only the reaction product of the alkali in the aqueous vehicle and asphaltogenic acids in the bitumen, it has been discovered that to obtain the above mentioned superior drying properties it is essential to add "Vinsol" resin in a quantity sufficient to lower the alkalinity of the emulsion to a pH of less than approximately 11, and from approximately pH 8.5 to pH 10 will often be preferred.

The above described neutralization and pH adjustment feature does not preclude incorporation in the emulsion of some additional "Vinsol" resin in the form which it assumes, when previously reacted with alkali. In such form, the "Vinsol" resin has no substantial effect in reducing alkalinity of the emulsion but the desired pH can be attained by the use of free "Vinsol" resin in combination with the sodium salt of "Vinsol" resin. The unreacted "Vinsol" resin combines with alkali in the emulsion and thereby reduces the pH to the desired value to give quick-drying characteristics.

As specific examples of the present invention, the following are given:

An emulsion of a 50–60 penetration petroleum asphalt was prepared and stabilized utilizing the following proportions of ingredients:

|  | Example 1 | Example 2 |
| --- | --- | --- |
|  | Per cent | Per cent |
| Asphalt (50–60 pen.) | 55 | 55 |
| NaOH | 0.15 | 0.15 |
| Water | 43.35 | 42.75 |
| "Vinsol" resin stabilizer | 1.50 | 2.10 |

In the above examples a preformed quick-breaking emulsion was first made by melting the asphalt and dispersing the melted asphalt in hot water containing caustic soda in the proportions indicated. The temperatures of the hot water and of the asphalt are not critical, except as it is necessary to have these components sufficiently hot that the asphalt may be readily dispersed and the necessary chemical reactions take place to form the emulsion.

An aqueous slurry of the "Vinsol" resin was prepared by using the resin in finely powdered form and stirring it into water free of alkali. Dispersion of the powder in the water may be facilitated by addition of a wetting agent, e. g. 1% by weight of borax based on the "Vinsol" resin. Known non-alkaline wetting agents may also be used to aid dispersion of the "Vinsol" powder in the water. Note that a small amount of alkali insufficient to react with all of the "Vinsol" resin may be utilized, as previously indicated. The "Vinsol" resin slurry so prepared was then added to the emulsion and reaction with the excess alkali in the aqueous phase occurred, which simultaneously stabilized the emulsion and reduced the alkalinity to less than pH 11.0. An excellent emulsion was produced, as shown by the following tests:

|  | Example 1 | Example 2 |
| --- | --- | --- |
| Residue | 56.2 | 55.4 |
| Demulsibility (0.02N CaCl₂) | 0 | 0 |
| Demulsibility (0.10N CaCl₂) | 0 | 0 |
| Cement test | 10 gms. | Pass |
| Cement test after 48 hours | Pass | Pass |
| Viscosity (Saybolt furol) | 16.8 | 15.8 |
| Screen (20 mesh) | 0.01 | 0.025 |
| pH | 10.8 | 10.7 |
| Settlement: |  |  |
| Top | 55.4 | 54.6 |
| Bottom | 57.4 | 56.2 |
| Difference | 2.0 | 1.6 |

The residue and demulsibility tests above listed are standard tests, see for example Asphalts and Allied Substances, 4th edition, by Abraham, pages 1136 and 1140, and A. S. T. M. Standards on Petroleum Products and Lubricants, Tentative Methods Designation D244–36T.

Curiously enough, it will be observed from the above data that the mixing stability of the emulsion improves with age whereas, with many prior stabilized emulsions, difficulty has been encountered by reason of deterioration with age. This ability of the stabilized emulsion to improve, or at least retain, its stability in storage is an important feature of the present invention.

Repeated reference has been made herein to the new and unpredictable improvement in drying rate of the finished emulsion which is obtained by the above process and adjustment of pH. In order to illustrate the improvement and for purposes of comparison, a quick-breaking bituminous emulsion was prepared as before and, in the two examples indicated below, the emulsion so prepared was stabilized by the addition of sodium salt of "Vinsol" resin in a quantity sufficient to give the same amount of "Vinsol" resin in the completed emulsion as was present in Examples 1 and 2. The proportion of ingredients in this second series of examples was as follows:

|  | Example 3 | Example 4 |
| --- | --- | --- |
|  | Per cent | Per cent |
| Asphalt (50–60 pen.) | 55 | 55 |
| NaOH | 0.15 | 0.15 |
| Sodium salt of "Vinsol" resin | 1.642 | 2.30 |
| ("Vinsol" resin equivalent) | 1.50 | 2.10 |
| Water | 43.35 | 42.75 |

The sodium salt of "Vinsol" resin was prepared by adding 9.5 parts of NaOH and 190.5 parts of water to 100 parts "Vinsol" resin and causing the caustic to react with the "Vinsol" resin to form an aqueous solution of sodium salts of "Vinsol" resin.

An emulsion was produced which would be satisfactory for many purposes, as shown by the following standard tests:

|  | Example 3 | Example 4 |
| --- | --- | --- |
| Residue | 58.2 | 57.6 |
| Demulsibility (0.02N CaCl₂) | 0 | 0 |
| Demulsibility (0.10N CaCl₂) | 0 | 0 |
| Cement Test | Trace | Trace |
| Cement test after 48 hours | Pass | Pass |
| Viscosity (Saybolt furol) | 44.1 | 33.2 |
| Screen (20 mesh) | 0.01 | 0.005 |
| pH | 11.9 | 11.6 |

Although useful, emulsions stabilized with an alkali metal salt of "Vinsol" resin are inferior for some purposes and, insofar as drying properties are concerned, will not pass some specification requirements relative to this feature. Hence, free "Vinsol" resin and sodium salts of "Vinsol" resin are not equivalent stabilizing agents. The vast difference in drying rate is shown by the following data on the four emulsions described above:

| Emulsion | Example 1 | Example 2 | Example 3 | Example 4 |
| --- | --- | --- | --- | --- |
| Per cent of available water freed in drying test | 62.4 | 72.3 | 19.1 | 14.4 |

Attention is directed to the fact that Emulsions 1 and 3 are directly comparable and that the improvement in drying rate using free "Vinsol" resin as a stabilizer was over three-fold in this comparative test. Likewise, Examples 2 and 4 are comparable and the improvement in drying rate was approximately five-fold in this instance. This feature of the invention is of predominant importance because of the fact that many emulsion purchasers specify that the emulsion must show a drying rate in the above test greater than 60%. This drying property alone, therefore, in many instances represents the difference between an extensively marketable product on the one hand as contrasted with a useful emulsion limited in its applications on the other hand.

Emulsions may be stabilized according to the present invention either immediately as manufactured and while still at the elevated temperatures resulting from the manufacturing operation, or after the emulsion has been cooled to atmospheric temperatures or below 100° F. Likewise, a portion of the "Vinsol" resin may be added to the emulsion during its formation so long as the quantity is sufficiently small to avoid neutralization of the alkali below the point necessary to effect saponification of the asphaltogenic acids in the bitumen and formation of the emulsion. In this mode of operation difficulties are encountered when more than approximately 1% of "Vinsol" resin based on the total amount of emulsion is added prior to saponification of the asphaltogenic acids and initial formation of the emulsion.

The proportion of "Vinsol" resin to be added to the emulsion will vary widely and depends upon not only the stability of the initial or preformed emulsion to be treated and stabilized, but also upon the ultimate stability desired in the finished emulsion. When the preformed primary emulsion is relatively stable as compared with ordinary quick-breaking emulsions, very small proportions of "Vinsol" resin may suffice to impart the added degree of stability necessary to enable the emulsion to pass the cement mixing test. In some instances, it is unnecessary that the emulsion should pass the cement mixing test and a small proportion of "Vinsol" resin may serve to impart the intermediate degree of stability desired. In general, from approximately 0.1 to approximately 2% of the "Vinsol" resin will give the desired degree of stability. As much as 5% or more "Vinsol" resin may be utilized for certain purposes.

Emulsions prepared according to the teachings of this specification remain stable even though stored at high temperatures of 100° F. or above for long periods of time. Also, these emulsions may be subjected to repeated cycles of freezing and thawing without coagulation or break-down. Further, the stabilizer is resistant to the action of those types of bacteria which cause deterioration and putrefaction of protein stabilizers such as casein, and the addition of preservatives for the "Vinsol" resin is therefore unnecessary.

The term "bituminous emulsion" as used herein embraces emulsions of thermoplastic substances such as asphalt, pitch, tar and other similar hydrocarbons or pyrogenous residues of organic substances which are normally solid, semi-solid viscous liquids at ordinary atmospheric temperatures.

The term "aqueous alkaline phase" used herein is intended to designate an aqueous phase having an alkalinity due to the presence of free alkali hydroxide and greater than that which is produced by the mere presence of ordinary neutral soaps. In other words, ordinary neutral soap solutions are not alkaline in the ordinary sense of the word, as herein contemplated, since they contain no free alkali and derive their alkalinity only from the relatively minor amount of hydrolysis of the soap.

As previously pointed out, the "Vinsol" resin referred to herein is a product of the Hercules Powder Company, sold under the trade-name "Vinsol Resin." This resin is a petroleum-insoluble solvent-extracted resin from pine wood, a typical sample of which is characterized by freedom from wood rosin, solubility in alcohol, substantial insolubility in gasoline, a methoxy content of about 3% to about 6%, an acid number of about 100, a naphtha insolubility of about 98% and a melting point of about 125° C. The process of manufacture and known characteristics of this resin are more fully disclosed in United States Letters Patent Nos. 2,114,393 to Fred H. Lane, and 2,193,026 to Lucius Coleman Hall. An average analysis of current commercial production is as follows:

Melting point (drop method)__degrees C__ 111.0
Acid number_____ 98
Gasoline soluble matter_____per cent__ 15
Toluene insoluble_____do__ 15.5

A resin of this analysis is suitable for the purposes of this invention. "Vinsol" resin is soluble in acetone, glacial acetic acid, amyl alcohol, amyl acetate, butyl alcohol, butyl acetate, chloroform, ethyl alcohol, ethyl acetate, ethyl ether, but insoluble in carbon tetrachloride, paraffin wax, petroleum oils, petroleum pitch, carbon disulfide and various of the vegetable oils, such as corn oil, cottonseed oil, soya bean oil, tung oil, linseed oil.

Although the complete chemical constitution of "Vinsol" resin is unknown, it is known that "Vinsol" resin is a pine wood pitch or resinous residue comprising oxidized resin acids, oxidized terpenes, polyphenols, polymerized terpenes, and more or less ligneous matter. Pine wood pitches may be obtained by extraction of Southern pine wood chips with a solvent. Such a pine wood pitch fraction, and one which is preferred as a stabilizer for the present invention, may be obtained by extraction of chips from stumps of Southern long-leaf pine with furfural or a coal tar hydrocarbon solvent and recovery of an extracted portion from the solvent, all as more fully described in said Letters Patents identified above.

The term "Vinsol resin" as used in the appended claims is intended to be generic to the above types of resins having properties equivalent for the purposes of this invention. The term "alkali salt of Vinsol resin" or "sodium salt of Vinsol resin" is used to designate the metallic salts of unknown constitution which are formed by the reaction of "Vinsol" resin with solutions of water-soluble alkali, such as sodium or potassium hydroxides, carbonates or phosphates.

The emulsion of this invention is adapted for use as a coating or waterproofing composition; for impregnation of woven fabrics, felted fabrics and paper; for pipe sealing compounds; for electrical insulation compounds; for mixing with mineral aggregates in paving and other similar operations and compositions; and for the stabilization of soil mixtures useful as surfaces for airports, for making adobe bricks, for roads or in dam constructions and the like.

Fibrous fillers such as asbestos or organic fibers such as cotton or mineral pigment fillers, such as ground petroleum coke, iron oxide, chromium oxide, or limestone dust, may be added singly or in combination to the completed emulsion when desired. Many other variations in composition and uses will be apparent to those skilled in the art and are to be regarded as falling within the scope of the present invention in its generic aspect.

Although preferred embodiments of the invention have been described in detail it is to be understood that the invention is not limited thereto but comprehends variations and modifications within the scope and spirit of the appended claims.

I claim:

1. Process of stabilizing a bituminous emulsion having an aqueous phase with an alkalinity greater than about pH 11.5, which comprises adding unsaponified Vinsol resin thereto and thereby reducing the alkalinity of said emulsion to a pH of approximately 8.5 to 10 by partial reaction with said unsaponified resin to produce a stable emulsion having improved drying properties.

2. A process of stabilizing a bituminous emulsion having an aqueous alkaline phase and a pH above about 11.5, which comprises reducing the alkalinity of said aqueous phase by partial reaction with unsaponified Vinsol resin to produce a stable emulsion having improved drying properties.

3. A process of stabilizing an alkaline bituminous emulsion, which comprises reacting a sufficient proportion of unsaponified Vinsol resin with alkaline constituents in said emulsion to reduce the alkalinity of said emulsion and to produce a stable emulsion having improved drying properties.

4. Process of stabilizing a bituminous emulsion having an alkaline aqueous phase which comprises adding unsaponified Vinsol resin thereto and thereby reducing the alkalinity of said aqueous phase by partial reaction with said unsaponified resin to produce a stable emulsion having improved drying properties.

5. Process of stabilizing a bituminous emulsion having an alkaline aqueous phase which comprises adding thereto an unsaponified resin characterized by freedom from wood rosin, solubility in alcohol, substantial insolubility in gasoline, a methoxy content of about 3% to about 6%, an acid number of about 100, a naphtha insolubility of about 98% and a melting point of about 125° C., and thereby reducing the alkalinity of said aqueous phase by reacting a portion of said unsaponified resin with said alkaline aqueous phase to produce a stable emulsion having improved drying properties.

6. Process of stabilizing an emulsion comprising bitumen held in dispersion in water by an emulsifying agent free of fatty acid soaps, said emulsion having an alkaline aqueous phase, which comprises adding unsaponified Vinsol resin thereto and thereby reducing the alkalinity of said aqueous phase by partial reaction with said unsaponified resin to produce a stable emulsion having improved drying properties.

7. Process of stabilizing an emulsion comprising bitumen held in dispersion in water by an emulsifying agent consisting only of the reaction products of naturally-occurring asphaltogenic acids and an alkali, said emulsion having an alkaline aqueous phase, which comprises adding unsaponified Vinsol resin thereto and thereby reducing the alkalinity of said aqueous phase by partial reaction with said unsaponified resin to produce a stable emulsion having improved drying properties.

8. Process as defined in claim 7 in which the alkalinity of said emulsion is reduced to within the range of approximately pH 8.5 to pH 11.

9. A stabililzed bituminous emulsion comprising an unstabilized bituminous emulsion having an aqueous alkaline phase and a sufficient proportion of unsaponified Vinsol resin partially reacted with the alkali of said alkaline aqueous phase to stabilize said unstabilized emulsion and improve its drying properties.

WALTER D. BUCKLEY.